US005333205A

United States Patent [19]

Bogut et al.

[11] Patent Number: 5,333,205

[45] Date of Patent: Jul. 26, 1994

[54] MICROPHONE ASSEMBLY

[75] Inventors: Henry A. Bogut, Coral Springs; Joseph Patino, Plantation, both of Fla.

[73] Assignee: Motorola, Inc., Schaumburg, Ill.

[21] Appl. No.: 24,012

[22] Filed: Mar. 1, 1993

[51] Int. Cl.[5] .......................... H04R 25/00; H04B 9/00

[52] U.S. Cl. ...................................... 381/172; 359/150

[58] Field of Search .......................... 381/172, 26, 170; 359/149, 150, 152, 154; 350/96.29

[56] References Cited

U.S. PATENT DOCUMENTS

| | | | |
|---|---|---|---|
| 2,835,744 | 5/1958 | Harris | 381/172 |
| 4,412,105 | 10/1983 | Muscatell | 381/172 |
| 4,432,604 | 2/1984 | Schwab . | |
| 4,553,813 | 11/1985 | McNaughton et al. . | |
| 4,556,280 | 12/1985 | Bagby . | |
| 4,732,446 | 3/1988 | Gipson et al. . | |
| 4,829,165 | 5/1989 | Kalawsky . | |
| 4,833,726 | 5/1989 | Shinoda et al. | 381/183 |
| 4,964,693 | 10/1990 | Branan, Jr. et al. . | |
| 5,195,087 | 3/1993 | Bennette et al. | 379/202 |

FOREIGN PATENT DOCUMENTS

| | | | |
|---|---|---|---|
| 0096499 | 6/1983 | Japan | 381/172 |
| 2079932 | 1/1982 | United Kingdom | 381/172 |

OTHER PUBLICATIONS

Ealing Electro-Optics Inc., data sheet disclosing optical filter, Aug. 1992, 4 pages.

*Primary Examiner*—Curtis Kuntz
*Assistant Examiner*—Sinh Tran
*Attorney, Agent, or Firm*—Pedro P. Hernandez

[57] ABSTRACT

A microphone assembly (134) includes a movable diaphragm (124) and a linear light gradient (130) which causes the movement of diaphragm (124) to be translated into a corresponding amplitude of light to be received at a photo-detector (116). Thereby providing for a fully optical microphone assembly which is immune to radio frequency interference and resistance losses.

2 Claims, 4 Drawing Sheets

100

MICROPHONE ASSEMBLY

TECHNICAL FIELD

This invention relates in general to microphone assemblies, and more specifically to an optical microphone assembly.

BACKGROUND

Remote microphone assemblies such as those used with radio communication equipment (e.g., two-way radios, etc.) are susceptible to radio frequency interference (RFI) caused by the radio when the radio is transmitting information. This interference is due to the close proximity of the microphone assembly to the radio's antenna when it is radiating RF energy. Presently, in order to shield microphone assemblies from RFI or electromagnetic interference (EMI) costly shielding of the microphone assembly is required. This added shielding usually takes the form of specially designed microphone housings or the addition of extra components, such as "desense capacitors", and/or RF chokes, to the microphone assembly.

Such RFI and EMI is found in portable applications and in mobile radio applications where the mobile radio is mounted in the trunk of the vehicle and the microphone assembly is wired through the car into the passenger compartment. In such vehicular installations, the PTT, keypad and microphone signals are very susceptible to interference.

Another problem encountered in some vehicular installations is the voltage drop caused by the extended cable lengths between the microphone assembly and the communication devices. Usually, the keypad and PTT signals generated at the microphone assembly are "read" by an analog-to-digital (A/D) converter circuit in the mobile which is looking for a particular voltage level corresponding to the button presses. When the extended cable lengths are added, the voltage windows detected by the A/D converter are altered due to the voltage drop caused by the cable's resistance. Also, such long cables act as antennas which increase the possibility of picking up unwanted noise.

A need thus exists for a microphone assembly which can provide for immunity from RFI/EMI interference and cable losses, while avoiding the need of expensive shielding techniques.

SUMMARY OF THE INVENTION

Figure 1:
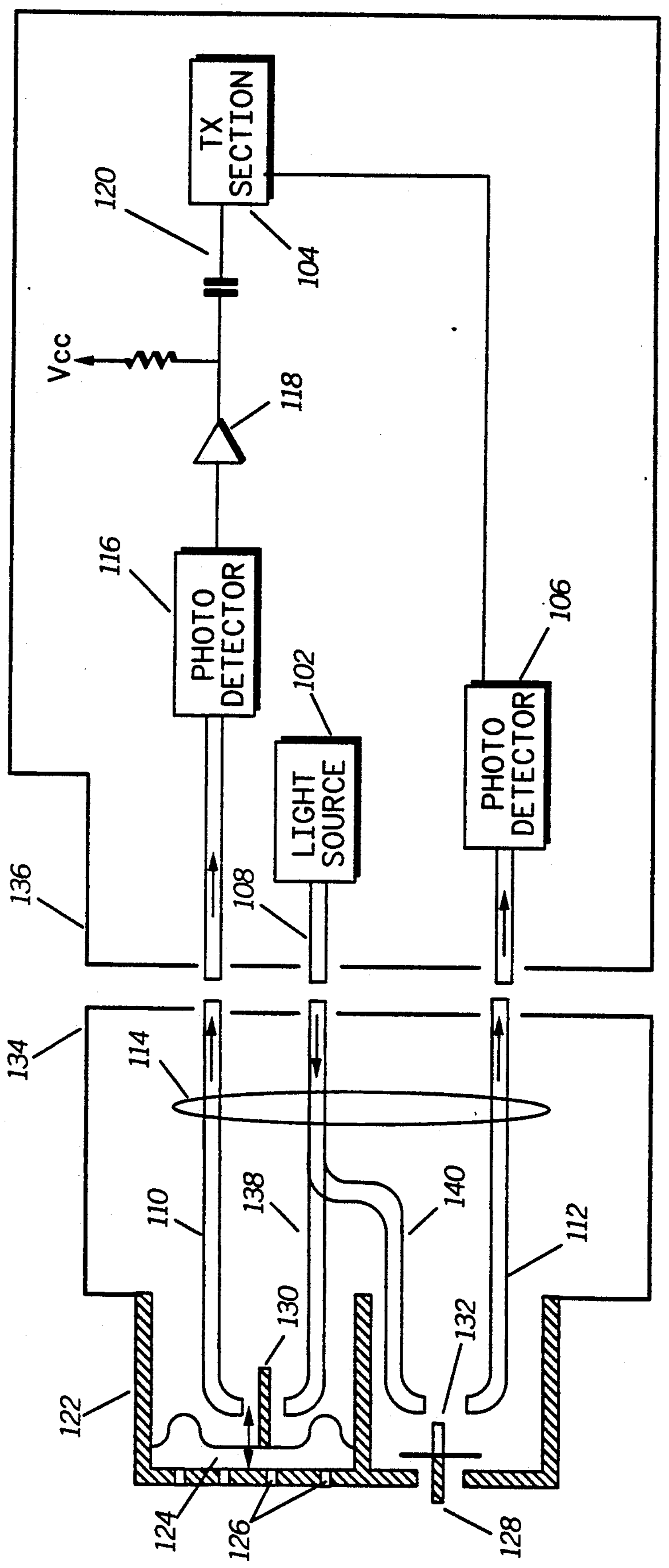
FIG. 1 is a block diagram of a microphone assembly coupled to a communication device in accordance with the present invention.

Briefly, according to the invention, there is provided a microphone assembly comprising a housing having a sound port for receiving sound waves and a diaphragm movably responsive to said sound waves. The microphone assembly further comprises an input for receiving an optical signal coupled to said housing and an attenuation means for attenuating the optical signal in response to the movement of said diaphragm. The microphone assembly providing increased immunity from radio and electromagnetic interference.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a combination microphone and communication device assembly 100 is shown. Assembly 100 includes a microphone assembly 134 which is attached to a communication device 136. In the preferred embodiment, microphone assembly 134 is a remote microphone assembly for use with a two-way radio, although the present invention can be used in any other application which a microphone is required. Microphone assembly 134 includes a housing 122 having audio port such as a plurality of microphone grill openings 126. A microphone diaphragm 124 which moves with the sound pressure created by a user speaking into the microphone grill openings 126 is located inside of housing 122 and in close proximity to grill openings 126. A light guide (fiber optic fiber) cable assembly 114 comprising a plurality of light pipes such as fiber optic lines 108, 110 and 112 is also located inside of housing 122. Optical line 108 allows for light generated by a constant light source circuit (e.g., light-emitting diode, incandescent lamp etc.) 102 found in the communication device 136 to propagate through the microphone assembly. The stream of light (optical signal) traveling via line 108 is preferably split into two lines 138 and 140 by use of a conventional optical splitting method such as an optical splitter.

The portion of the light traveling via optical line 138 is sent through an optical conversion means, preferably an attenuation means such as a linearly variable density light gradient (optical filter) 130 which is attached to diaphragm 124 by way of any one of a number of attachment means such as by using adhesives, staking, etc. Light gradient 130 is preferably a linearly variable neutral density filter having a length of approximately the same size as the maximum amount of deflection which diaphragm 124 can undergo. Means 130 could also be any other type of optical filter which can provide different light characteristics to be developed, depending on where along the filter's length the light passes (e.g., a filter that provides a change in the frequency of the light, etc.). As diaphragm 124 is modulated by sound pressure waves caused by a user speaking into microphone 134, light gradient (filter) 130 moves horizontally an equal amount causing different amounts (amplitudes) of light to travel to recovery line 110. As light gradient 130 is moved horizontally between the gap formed by optical lines 138 and 110 different amounts of light are allowed to pass corresponding to the amount of deflection which diaphragm 124 is undergoing. The point at which light originating in optical line 138 strikes gradient 130 will determine the amount of light which is allowed to cross over to recovery line 110.

As the amplitude modulated optical signal is recovered by optical line 110, it is detected by a photo-detector 116 which converts the received light into corresponding electrical signals. Photo-detector 116 can be anyone of a number of commercially available detectors known to those in the art such as, photo-resistors, linear photo-transistors, photo-voltaic devices, etc. The electrical signals produced by detector 116 are then amplified by amplifier 118 prior to the modulated signals at output 120 being sent to the modulation circuits found in conventional radio frequency transmitter 104. A second path from constant light source 102 is formed by optical line 140 which sends light having a predetermined amplitude (intensity) to a microphone control such as a push-to-transmit (PTT) switch 128. PTT switch 128 is preferably a push button switch having a light blocking portion 132. When PTT switch 128 is depressed into housing 122, light blocking portion 132 blocks out light traveling between optical line 140 and into recovery line 112. As light is blocked from traveling via line 112, a photo-detector circuit 106 located in the communication device determines that the PTT switch has been depressed since it senses a change in the amount of light being detected. Photo-detector circuit 106 can be any conventional photo-detector circuit similar to detector circuit 116. Other microphone controls such as keypads, etc. can also be used with the present invention.

Figure 4:
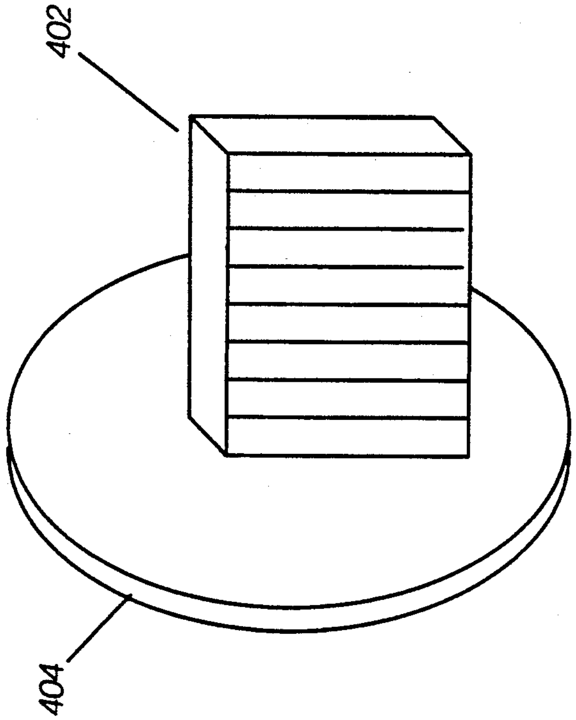
FIG. 4 is a diagram of a light gradient attached to the microphone diaphragm in accordance with the invention.

Referring to FIG. 4, a diagram of a linearly variable light gradient 402 attached to a microphone diaphragm 404 is shown. As mentioned above, the gradient 402 can be attached to the diaphragm 404 using any one of a number of commercially available adhesives, etc. Gradient 402 should be chosen so that it is stiff enough to minimize any bending over its length. Bending of gradient 402 is not desirable since it may distort the conversion from the diaphragm movement into a corresponding light amplitude that is received by the photo-detector. The weight of gradient 402 should be such that it minimally effects the movement of diaphragm 404. The gap between optical line 110 and 138 can be such were it can support the gradient as it moves horizontally between the two optical lines. Thereby preventing bending of gradient 130.

Figure 3:
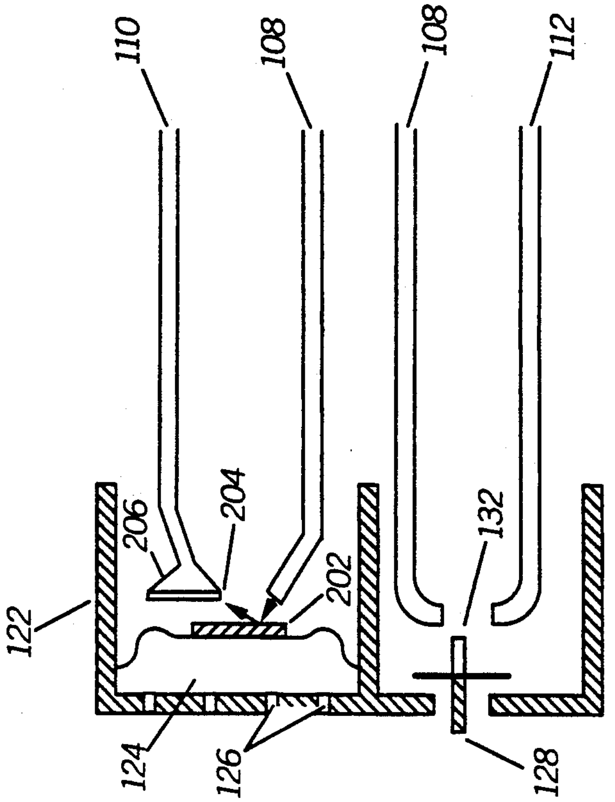
FIG. 3 is the block diagram of the microphone assembly of FIG. 2 showing the microphone diaphragm at full deflection.
Figure 2:
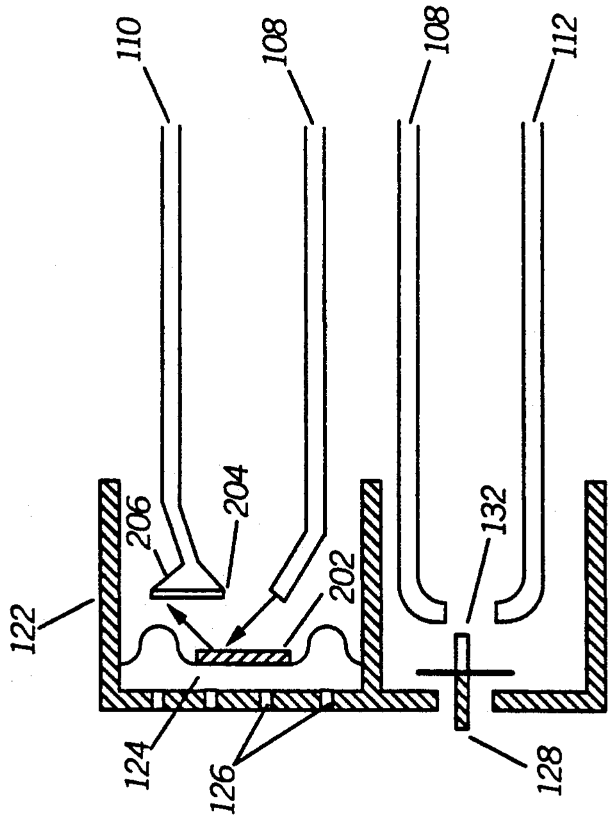
FIG. 2 is a second embodiment of a block diagram of a microphone assembly in accordance with the present invention.

In FIG. 2, a second embodiment of the present invention is shown. In this embodiment a reflective means such as a mirror 202 or other reflective material is attached along the wall of diaphragm 124. As diaphragm 124 is deflected by sound pressure coming in via microphone grill 126, the deflection causes the light emanating from line 108 to strike the mirror 202 at a different location due to the change in angle. In FIG. 2, diaphragm 124 is shown in a "no deflection" condition (no sound pressure present). In FIG. 3, the diaphragm is shown in its fully deflected state (maximum sound pressure).

As can be seen by looking at FIGS. 2 and 3, when diaphragm 124 is in its rest state, the light beam strikes mirror at one end, while when the diaphragm is fully deflected, the light beam strikes the gradient at its other end. Any deflection points in-between strike the mirror in points in-between the two end points. Mirror 202 causes light to strike receiver means such as a flared out portion 204 of recovery line 110 which has a linearly variable density gradient 206 attached to its end point. The flared section 204 of optical line 110 can be a specially designed portion of fiber optic material or other suitable light-transmittive materials having the required dimensions.

Mirror 202 deflects the light it receives via line 108 into a corresponding point on gradient 204. Each point of deflection of the diaphragm having a corresponding point in which light is received at gradient 204. Light received is then attenuated by the gradient by an amount determined by the point in which the light strikes gradient 206. The attenuated light then travels via line 110 in order to be converted from modulated light into electrical signals which can be transmitted by RF transmitter 104.

Figure 5:
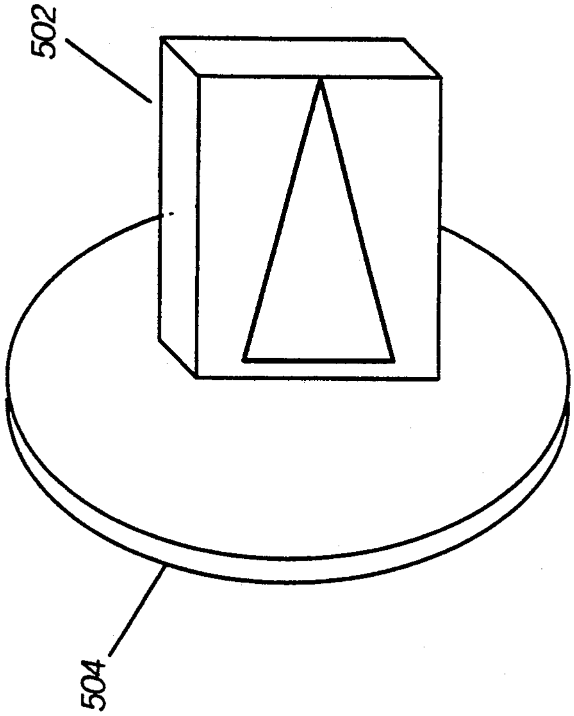
FIG. 5 is a diagram of another embodiment of the present invention showing a progressive light shutter attached to a microphone diaphragm in accordance with the invention.

Referring now to FIG. 5, another embodiment of the present invention is shown. In this embodiment instead of using a linearly variable light gradient 130 as shown in FIG. 1, a variable attenuation shutter 502 is utilized. Shutter 502 allows for different amounts of light to travel through it depending on how much deflection is being forced on diaphragm 124 in FIG. 1. In the case of FIG. 5 as shown, the more deflection placed on diaphragm 504 the more amount of light is allowed to pass between optical lines.

Figure 6:
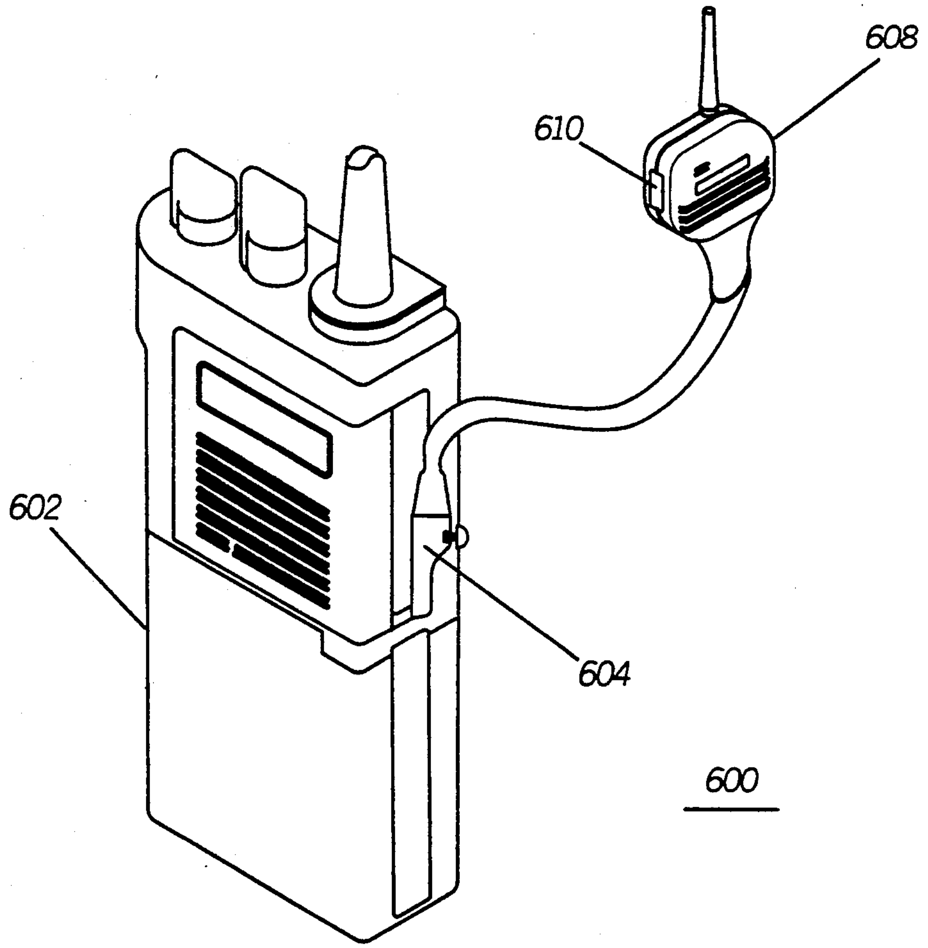
FIG. 6 is a block diagram of a communication device in accordance with the present invention.

In FIG. 6, a diaphragm of a communication device such as a two way radio 602 coupled to a remote microphone 608 in accordance with the present invention are shown. Remote microphone includes an optical cable 606 having a connector 604 for coupling to radio 602. Connector 604 can be coupled by a number of well known means, such as by use of a captivated screw which attaches to a threaded insert located in the housing of radio 602. Remote microphone 608 also includes a PTT switch 610 for activating the transmitter in radio 602.

In summary, by providing a microphone assembly which is fully optical, reduces the likelihood of the microphone assembly will become susceptible to RFI or EMI. Also, the present invention removes all active (electronic) components from the microphone assembly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication device assembly, comprising:

a transmitter for transmitting information signals; and a microphone assembly coupled to the transmitter, the microphone assembly comprising:

a microphone housing having a sound port for receiving sound waves;

a diaphragm coupled to the microphone housing and movably responsive to said sound waves;

a light source located within the housing for providing an optical signal;

a reflective means coupled to the diaphragm for reflecting said optical signal in response to movement of said diaphragm;

a variable gradient for receiving said reflected optical signal and attenuating the reflected optical signal by an amount which is related to the amount of movement experienced by the movable diaphragm;

an optical push-to-talk (PTT) switch coupled to the microphone housing for selectively attenuating the optical signal; and a photo-detector for receiving the attenuated optical signal when the optical push-to-talk (PTT) switch is activated and converting the attenuated optical signal into an electrical signal which controls the transmitter.

2. A communication device assembly as defined in claim 1, wherein the reflective means comprises a mirror which is attached to the diaphragm.

* * * * *